United States Patent
Langer et al.

[11] Patent Number: 5,932,059
[45] Date of Patent: Aug. 3, 1999

[54] METHOD FOR PRODUCING A THREE-DIMENSIONAL OBJECT

[75] Inventors: Hans Langer, Gräfelfing; Johannes Reichle, München, both of Germany

[73] Assignee: EOS GmbH Optical Systems, Planegg, Germany

[21] Appl. No.: 08/956,078

[22] Filed: Oct. 22, 1997

Related U.S. Application Data

[63] Continuation of application No. 08/507,410, filed as application No. PCT/EP94/00900, Mar. 22, 1994, abandoned.

[30] Foreign Application Priority Data

Mar. 24, 1993 [DE] Germany .............................. 43 09 524

[51] Int. Cl.⁶ .................................................. B29C 67/00
[52] U.S. Cl. ..................................... 156/275.5; 156/272.8; 156/290; 156/307.1; 264/401; 264/125; 264/308; 264/DIG. 59
[58] Field of Search .............................. 156/272.2, 272.8, 156/273.3, 275.5, 290, 307.1; 264/401, 308, DIG. 51, DIG. 59, 125

[56] References Cited

U.S. PATENT DOCUMENTS

| | | | |
|---|---|---|---|
| 5,015,424 | 5/1991 | Smalley | 264/401 |
| 5,104,592 | 4/1992 | Hull et al. | 264/401 |
| 5,130,064 | 7/1992 | Smalley et al. | 264/401 |
| 5,182,055 | 1/1993 | Allison et al. | 264/401 |
| 5,182,056 | 1/1993 | Spence et al. | 264/401 |
| 5,238,639 | 8/1993 | Vinson et al. | 264/401 |
| 5,256,340 | 10/1993 | Allison et al. | 264/401 |
| 5,415,820 | 5/1995 | Furuta et al. | 264/401 |
| 5,496,683 | 3/1996 | Asano | 430/269 |
| 5,562,929 | 10/1996 | Asano | 425/174.4 |

FOREIGN PATENT DOCUMENTS

| | | |
|---|---|---|
| 0 171 069-A | 2/1986 | European Pat. Off. . |
| 0 338 751 A2 | 10/1989 | European Pat. Off. . |
| 0 362 982-A | 4/1990 | European Pat. Off. . |
| 0 429 196 | 5/1991 | European Pat. Off. . |
| 0 484 183 A1 | 5/1992 | European Pat. Off. . |
| 42 33 812 | 11/1993 | Germany . |
| 79007 | 9/1989 | Israel . |
| 2-95830 | 4/1990 | Japan . |
| 3-193433 | 8/1991 | Japan . |
| 5169550 | 7/1993 | Japan . |
| 6114948 | 4/1994 | Japan . |
| 6206260 | 7/1994 | Japan . |
| 6270265 | 9/1994 | Japan . |
| 7-57531 | 6/1995 | Japan . |
| 7-57532 | 6/1995 | Japan . |
| WO 92/08200 | 5/1992 | WIPO . |
| WO 92/20505 | 11/1992 | WIPO . |

OTHER PUBLICATIONS

SLA–250, User Ref. Manual, Software Release 3.40, 3D Systems Inc.—Apr., 1989.
Kunststof en Rubber, Bd. 45, Nr. 2, pp. 11 to 18.
Partial translation of DE 42 33 812.
Partial translation of JP–2–95830.

*Primary Examiner*—James Sells
*Attorney, Agent, or Firm*—Dike, Bronstein, Roberts & Cushman, LLP; George W. Neuner

[57] ABSTRACT

In a method for producing a three-dimensional object wherein the object is generated by successive solidification of individual layers of the object from a liquid or powdery material by action of electromagnetic radiation, the problem arises that the object is either distorted due to shrinkage of the material or that the quality of the surface of the object is poor when using a corresponding shrinkage reducing construction. For the solution of this problem, each layer is separated in an inner core region (2) and an outer shell region (3) and the action of the radiation is controlled in the core region and in the shell region for generating different properties of both regions.

42 Claims, 1 Drawing Sheet

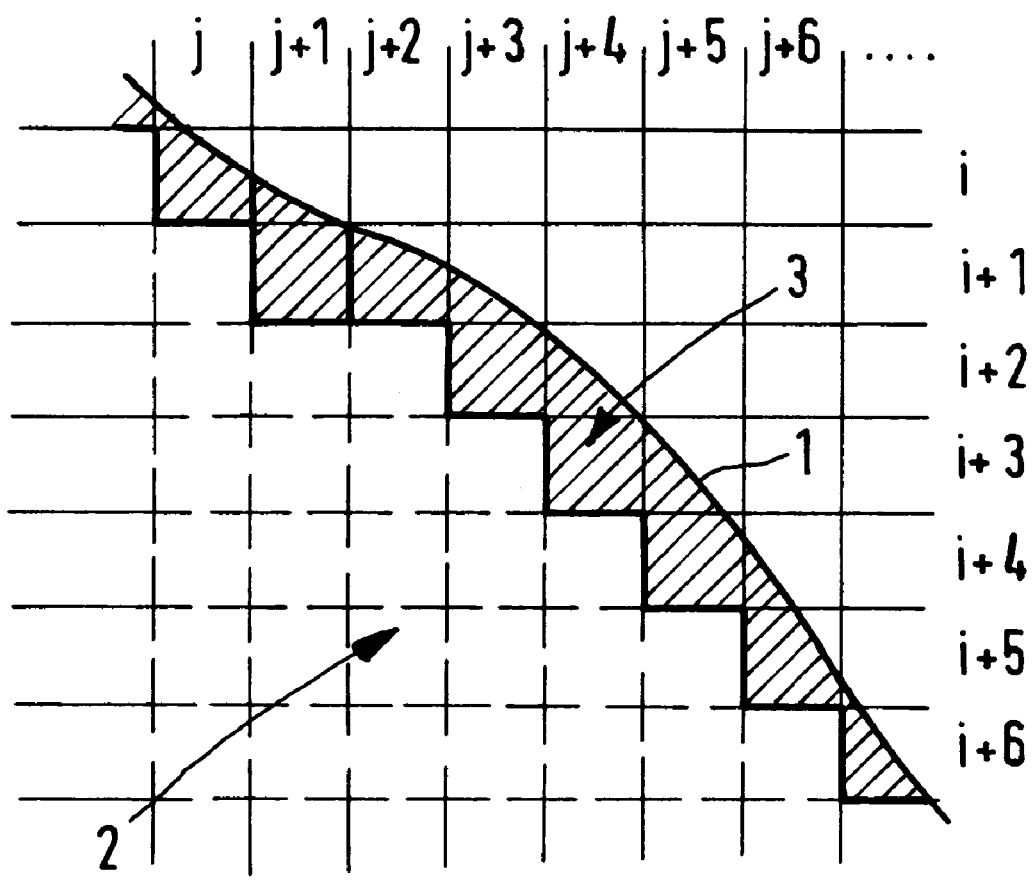

5,932,059

METHOD FOR PRODUCING A THREE-DIMENSIONAL OBJECT

This application is a continuation of Applicatio Ser. No. 08/507,410 filed Aug. 22, 1995 abandoned which is a 371 of PCT/EP94/00900 filed Mar. 22, 1994.

FIELD OF THE INVENTION

The present invention relates to a method for producing a three-dimensional object wherein the object is generated by successive solidification of individual layers of a liquid or powdery, hardenable material by action of electromagnetic radiation.

BACKGROUND OF THE INVENTION

Such a method is known from the disclosure in EP 0 171 069 A. With such a method a good surface can be obtained but a problem arises in that maintaining the dimension of the object is not ensured due to the deformation of the individual layers because of shrinkage of the material. In addition, the production time is long.

In order to reduce the deformations, it is known from the disclosure in EP 0 362 982 A either to solidify individual strips that are connected with adjacent and underlying strips only via a support construction or to solidify the layer only in regions wherein gaps between the regions result in the object. In both cases a high quality of the surface cannot be obtained.

It is an object of the invention to improve a method for making three-dimensional objects by successive solidification of individual layers such that a small deformation of the object simultaneously with a high quality of the surface is obtained. Furthermore, the accuracy of the surface should be increased and the consumption of material and the production time should be reduced.

SUMMARY OF THE INVENTION

According to the invention, this object is achieved by a method having the features that each layer is separated into an inner core region and an outer shell region and that the action of the radiation is controlled differently in the core region than in the shell region for generating different properties of both regions. Further embodiments of the invention are characterized in that:

i. the action of the radiation in the core region is effected such that the deformation of the object is minimal during and after the solidification and that the action of the radiation in the shell region is effected for generating a surface as smooth and accurate as possible;

ii. in the core region, individual partial regions having a distance from each other are solidified and that, if necessary, the gaps between the partial regions are also solidified after solidification of the partial regions of one layer or after solidification of all partial regions of the object;

iii. in the core region, individual strips solidified to be connected with adjacent and underlying strips through a support construction;

iv. first of all, in the core region, partial regions of a layer are solidified and thereby connected with underlying partial regions of the previously solidified layer to multiple-layer cells, that thereafter the partial regions are connected with the adjacent partial regions of the same layer by solidifying narrow connection regions between the partial regions in the form of connecting webs, and that finally the gaps between the partial regions are solidified;

v. the connecting regions are only solidified after a waiting period corresponding to a shrinkage of the partial regions be at least a predetermined size;

vi. the partial regions are formed for generating hollow structures, preferably honey comb structures;

vii. in the shell region closely adjacent partial regions are solidified;

viii. the action of the radiation is effected in the shell region along one or several lines describing the outer boundary of the shell region or being parallel to this boundary;

ix. the layer thickness in the shell region is selected smaller than in the core region;

x. first of all, an integer number N of layers of the shell region are solidified and thereafter a layer of the core region is solidified having a thickness corresponding to N-times the thickness of the N layers of the shell region;

xi. in the shell region, volume elements of the object are defined in one layer wherein the volume elements lie within a predetermined distance from the boundary of the object in this layer;

xii. volume elements in the shell region are defined which are touched or cut by the boundary or the contour of the object in one layer and/or in a predetermined number of preceding and/or following layers of this layer;

xiii. for the shell region, a layer thickness of 0.1 to 5 mm, preferably 0.5 to 2 mm, is selected; and xiv. in the shell region, openings are formed through which unsolidified material can drain.

BRIEF DESCRIPTION OF THE DRAWING

FIG. 1 is a graph illustrating a layer divided into a plurality of regions and the contour of an object to be manufactured.

DETAILED DESCRIPTION OF THE INVENTION INCLUDING THE PREFERRED EMBODIMENTS

An embodiment of the invention will be described in the following in connection with FIG. 1 showing in a schematic representation a section through a part of the object in a plane of a layer.

The method according to the invention works, for example, according to the method known under the term "stereography" or "stereolithography" as described in the EP-A-0 171 069. According to this method, a layer of a liquid or powdery material is applied on a support or on a layer already solidified and is solidified by means of irradiation with a directed lightbeam, for example a laser, at positions corresponding to the object. By solidifying a plurality of layers the object is constructed layer by layer. For a more detailed description of this method, reference is made to the above-mentioned EP-A-0 171 069, the disclosure of which is incorporated by reference.

A partial view of an exemplary layer is depicted in FIG. 1 with reference to which the method according to the invention is first of all described in principle. In FIG. 1, line 1 indicates the contour of the object to be manufactured in the layer. The area of the layer is divided gridwise into a plurality of square or rectangular individual regions or voxels i, j . . . i+6, j+6 having a side length of 0.1 to 5 mm, preferably of 0.5 to 2 mm. data for the spatial coordinates of the contour 1 and of each of the individual regions are available in a computer which controls the irradiation of the layer. In the computer, a comparison of the contour data with the coordinate data of the individual regions is made. If the computer ascertains that an individual region, for example, the individual region i+1, j, lies completely within the contour 1, then this individual region is assigned to a core region 2; if, however, it is ascertained that an individual region, for example, the individual region i, j, is cut by the contour 1, then this individual region is assigned to a shell region 3. Thus, a narrow shell region 3 is determined which extends along the contour line 1 and has an average width corresponding to approximately the side length of the individual regions.

Preferably, the calculation of the core region 2 is carried out exclusively in the computer; thereafter, the shell region 3 is calculated by subtracting the individual regions of the core region 2 from the contour of the entire body. In the calculation of the core region 2, all individual regions lying completely in the inside of the body section, i.e., inside of the contour line 1, are marked.

In particular, the assignment of the individual regions to the shell or to the core is made not only in a two-dimensional manner, as in principle described above, but in a three-dimensional manner in order to obtain a defined thickness of the shell region 3 in all three spatial directions.

In this case, a contour surface corresponds to the contour line 1 and in the calculation of the core region all individual regions lying completely in the inside of this contour surface are marked. Each individual region i, j thereby includes, besides the information about the actual layer, also the corresponding information of the preceding layers. Doing this, only those individual regions are marked as belonging to the core which represent or would represent core regions if they were in a predetermined number of preceding layers as well. The predetermined number depends upon the desired shell thickness and the spatial distance of the individual regions; at a layer thickness of 0.1 mm and a shell thickness of 0.5 mm, for example, this number is 5. The same consideration is valid also for following layers; that is, only those individual regions are counted as belonging to the core which belong or would belong if they were in a predetermined number of succeeding layers to the core, as well.

After the assignment of all individual regions of a layer to the shell region or to the core region, the solidification is effected by irradiating the layer within the individual regions at the positions corresponding to the object. This irradiation is carried out in a different manner depending on whether the individual region is in the core region or in the shell region. Since, in the core region 2 (as compared to the narrow shell region 3), a small distortion, a small consumption of material and short building times are important, the individual regions in that region are not irradiated or solidified over the entire layer, but are irradiated or solidified in the form of single cells being connected to each other either by narrow webs or preferably not being connected at all, but separated by separating joints. Alternatively, it is possible to solidify the individual regions in the core region 2 only along closed lines, so as to produce hollow structures, for example, like honey comb structures, in which liquid or powdery material still is enclosed and which, after the initial solidification of the object, is either drained off or solidified by means of after-hardening. This method is particularly suitable for avoiding thermal expansions, for example, in case of melt-out molds and, in addition, it is suitable for the direct production of molds. In this case, the inverted shape of the object is put in an enveloping cuboid. It results a negative shape for which a separation in shell and core is carried out in the above-described manner.

In the core region 2, the irradiation is effected such that a high degree of polymerization and, thereby, a high stability with small tendency to distortion is achieved.

In the shell region 3, a high accuracy and quality of the surface at the contour 1 is important. For achieving this, the irradiation or solidification in the shell region 3 is carried out over each entire individual region within the shell region either in the form of adjacent hatch lines or in the form of one or several adjacent contour lines, i.e., of groups of lines following the contour 1, for example, as a polygonal line (see FIG. 1). A combination of these line types in one layer or in layers lying on top of each other is also possible.

The irradiation in the core region 2 and in the shell region 3 of an individual layer can be effected simultaneously or also consecutively by a corresponding controlling by using a single or several light beams or laser beams, wherein the layer thickness in the core region 2 is the same as the layer thickness in the shell region 3. However, it is of a particular advantage to solidify first a number N of layers of the shell region 3, N being an integer. The material in the core region 2 first remains liquid or powdery having a layer thickness corresponding to N-times [of] the layer thickness of the shell region 3. After the N-th layer of the shell region is solidified, this N-times thick layer of the core region is also solidified by a correspondingly intensive irradiation. Thereby, the time needed for the production of the core and, therefore, for the production of the object can be reduced substantially.

If the core is not completely solidified, it is preferable to provide openings in the shell through which the liquid or powdery material, which remains in the core, can drain after the solidification of the object. This may be carried out, for example, such that, in each n-th layer, perforations of the shell region 3 are provided which are sized so that on one hand the material can flow out and on the other hand the surface quality is not reduced.

The particular advantage of the method described is that a relatively stable shell is produced by the stacked shell regions 3. The stable shell permits production of the core region by means of a technique that minimizes distortion without reducing the stability of the object. For example, only due to this shell is it possible to eliminate the connection webs between the single cells or the hollow structures of the core region. Furthermore, the manufacturing time is reduced substantially due to the fact that, in the core forming the main part of the object volume, the solidification is effected only partially.

We claim:

1. A method for producing a three-dimensional object by successive solidification of sections of said object in individual layers of a liquid or powdery, hardenable material by action of electromagnetic radiation, said method comprising the following steps in the production of each layer:
    a) separating said section of said object in the layer into an inner core region and an outer shell region; and
    b) solidifying said core region and said shell region by action of electromagnetic radiation wherein said action of said radiation is controlled differently in said core region and in said shell region for generating different properties of both regions and wherein the action of said radiation is effected in said core region in such a manner that a deformation of said object is minimal during and after solidification and is effected in said shell region in such a manner that a surface of said object is generated as smooth and accurate as possible, wherein said shell region is determined by dividing said core region into individual regions and subtracting said individual regions in a three-dimensional manner from an entire body representing said object.

2. The method of claim 1, wherein individual partial regions having distance from each other are solidified in said core region and gaps between said partial regions are also solidified after solidification of said partial regions of one layer or after solidification of all partial regions of said object.

3. The method of claim 1, wherein:

in said core region, single strips are solidified which are connected with adjacent and underlying strips through a support construction.

4. The method of claim 1, wherein:

in a first step, partial regions of a layer are solidified in said core region said partial regions being thereby connected with underlying partial regions of a previously solidified layer to build up multiple-layer cells, and in a second step, said partial regions are connected with adjacent partial regions of the same layer by solidifying narrow connection regions in the form of connecting webs between said partial regions, and finally, gaps between said partial regions are solidified.

5. The method of claim 4, wherein said connecting regions are solidified only after a waiting period corresponding to a shrinkage of said partial regions by at least a predetermined size.

6. The method of claim 2, wherein said the partial regions are formed for generating hollow structures.

7. The method of claim 6, wherein said hollow structures comprise honey comb structures.

8. The method of claim 1, wherein:

in said shell region closely adjacent partial shell regions are solidified.

9. The method of claim 1, wherein:

in said shell region, said action of said radiation is effected along one or several lines describing an outer boundary of said shell region or being parallel to said boundary.

10. The method of claim 1, wherein a layer of thickness in said shell region is made smaller than in said core region.

11. The method of claim 1, wherein:

first, an integer number N of layers of said shell region are solidified, and thereafter, a layer of said core region having a thickness corresponding to N-times of said thickness of said layers of said shell region is solidified.

12. The method of claim 1, wherein:

for said shell region, volume elements of said object are defined in one layer, said volume elements lying within a predetermined distance from a contour of said object in said layer.

13. The method of claim 12, wherein such volume elements are defined which are touched or cut by said contour of said object in said one layer and also in a predetermined number of preceding and/or succeeding layers of said one layer.

14. The method of claim 12, wherein such volume elements are defined which are touched or cut by said contour of said object in said one layer or in a predetermined number of preceding and/or succeeding layers of said one layer.

15. The method of claim 1, wherein a thickness of said shell region is in the range of 0.1 to 5 mm.

16. The method of claim 15, wherein said thickness of said shell region is in the range of 0.5 to 2 mm.

17. The method of claim 1, wherein:

in said shell region, openings are formed through which unsolidified material can drain from said core region.

18. The method of claim 9, wherein:

in said shell region, the irradiation is effected in the form of adjacent contour lines.

19. The method of claim 1, wherein:

in said shell region, the irradiation is effected in the form of adjacent hatch lines.

20. The method of claim 1, wherein said object or an inverted object is disposed in an enveloping cuboid and a negative shape of said object is obtained therefrom.

21. The method of claim 20, wherein said negative shape is separated into a shell region and a core region.

22. The method of claim 21, wherein said negative shape is used as a mold.

23. The method of claim 1, wherein said shell region has a predetermined thickness.

24. A method for producing a three-dimensional object by successive solidification of sections of said object in individual layers of a liquid or powdery, hardenable material by action of electromagnetic radiation, said method comprising the following steps in the production of each layers:

a) separating said section of said object in the layer into an inner core region and an outer shell region; and b) solidifying said core region and said shell region by action of electromagnetic radiation wherein said action of said radiation is controlled differently in said core region and in said shell region for generating different properties of both regions;

wherein, in said object, said shell region has a predetermined thickness in each of three spatial directions.

25. The method of claim 24, wherein a thickness of said shell region is in the range of 0.1 to 5 mm.

26. The method of claim 24, wherein said thickness of said shell region is in the range of 0.5 to 2 mm.

27. The method of claim 24, wherein:

in said shell region, openings are formed through which unsolidified material can drain.

28. The method of claim 24, wherein:

in said shell region, the irradiation is effected in the form of adjacent contour lines.

29. The method of claim 24, wherein:

in said shell region, the irradiation is effected in the form of adjacent hatch lines.

30. The method of claim 24, wherein said object or an inverted object is disposed in an enveloping cuboid and a negative shape of said object is obtained therefrom.

31. The method of claim 24, wherein said negative shape is separated into a shell region and a core region.

32. The method of claim 24, wherein said negative shape is used as a mold.

33. A method for producing a three-dimensional object by successive solidification of sections of said object in individual layers of a liquid or powdery, hardenable material by action of electromagnetic radiation, said method comprising the following steps in the production of each layer:

a) separating the section of said object in the layer into an inner core region and an outer shell region; and b) solidifying said core region and said shell region by action of electromagnetic radiation wherein in said shell region the irradiation is effected in form of adjacent contour lines.

34. The method of claim 33, wherein:

in said object, said shell region has a predetermined thickness.

35. The method of claim 34, wherein a thickness of said shell region is in the range of 0.1 to 5 mm.

36. The method of claim 34, wherein said thickness of said shell region is in the range of 0.5 to 2 mm.

37. The method of claim 33, wherein:

in said shell region, openings are formed through which unsolidified material can drain.

38. A method for producing a mold for a three-dimensional object by successive solidification of individual layers of a negative shape of said object from a liquid or powdery, hardenable material by action of electromagnetic radiation, said method comprising the following steps:

a) generating a negative shape of said object;

b) layerwise building said negative shape thereby performing for each layer the following steps;

b1) separating said negative shape of said object into an inner core region and an outer shell region; and b2) solidifying said core region and said shell region by action of electromagnetic radiation.

39. A method for producing a three-dimensional object by successive solidification of sections of said object in individual layers of a liquid or powdery, hardened material by action of electromagnetic radiation, said method comprising the following steps in the production of each layer:

a) separating said section of said object in the layer into an inner core and the outer shell region; and b) solidifying said core region and said shell region by action of electromagnetic radiation wherein said action of said radiation is controlled differently in said core region and in said shell region for generating different properties of both regions;

wherein said shell region is determined by dividing said core region into individual regions and subtracting said individual regions in a three-dimensional manner from an entire body representing said object.

40. The method of claim 39, wherein said action of said radiation is effected in said core region in such manner that a deformation of said object is minimal during and after solidification and is effected in said shell region in such a manner that a surface of said object is generated as smooth and accurate as possible.

41. The method of claim 39, wherein said shell region has an average width corresponding to approximately the side length of said individual regions.

42. A method for producing a mold for a three-dimensional object by successive solidification of individual layers of a negative shape of at least a portion of said object from a liquid or powdery, hardenable material by action of electromagnetic radiation, said method comprising the steps of:

a) generating a negative shape of at least a portion of said object;

b) layerwise building said negative shape thereby performing for each layer the following steps;

b1) separating said negative shape of said object into an inner core region and an outer shell region; and b2) solidifying said core region and said shell region by action of electromagnetic radiation.

* * * * *